US011975323B2

(12) United States Patent
He et al.

(10) Patent No.: US 11,975,323 B2
(45) Date of Patent: May 7, 2024

(54) MICROFLUIDIC CHIP CAPABLE OF FINELY ADJUSTING COAXIAL ALIGNMENT OF CAPILLARY TUBES

(71) Applicant: BEIJING UCALERY TECHNOLOGY AND DEVELOPMENT CO., LTD., Beijing (CN)

(72) Inventors: Kunyun He, Bejing (CN); Benxiang Zhang, Bejing (CN); Yongzheng Zheng, Bejing (CN)

(73) Assignee: BEIJING UCALERY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/273,264

(22) PCT Filed: Nov. 3, 2021

(86) PCT No.: PCT/CN2021/000215
§ 371 (c)(1),
(2) Date: Jul. 19, 2023

(87) PCT Pub. No.: WO2023/060368
PCT Pub. Date: Apr. 20, 2023

(65) Prior Publication Data

US 2024/0033732 A1 Feb. 1, 2024

(30) Foreign Application Priority Data

Oct. 11, 2021 (CN) .......................... 202111168539.4

(51) Int. Cl.
*B01L 3/00* (2006.01)
*B01F 23/41* (2022.01)
*B01F 33/302* (2022.01)

(52) U.S. Cl.
CPC ..... *B01L 3/502715* (2013.01); *B01F 23/4143* (2022.01); *B01F 33/3021* (2022.01);
(Continued)

(58) Field of Classification Search
CPC ......... B01L 3/502715; B01L 3/502784; B01L 3/5027; B01L 2300/0819;
(Continued)

(56) References Cited

U.S. PATENT DOCUMENTS 5,380,089 A * 1/1995 Karasawa ............... B01F 25/23
366/162.4
7,752,896 B2 * 7/2010 Iwata ..................... G01N 30/84
73/61.52

(Continued)

FOREIGN PATENT DOCUMENTS

CN 203894166 U 10/2014
CN 105754116 A 7/2016

(Continued)

*Primary Examiner* — Minh Q Le
(74) *Attorney, Agent, or Firm* — SZDC Law PC

(57) ABSTRACT

A microfluidic chip includes an integrated chip support (1), a continuous phase liquid inlet (1-6), an intermediate phase liquid inlet (1-7), a dispersed phase liquid inlet (2), an injection capillary tube (3), a collection capillary tube (4), a collection port (5), capillary tube nesting assemblies (6) and capillary tube coaxial fine adjustment assemblies (7). The chip support (1) is provided with threaded holes (1-1), sealing holes (1-2), capillary tube coaxial alignment holes (1-3), adjusting holes (1-4) and positioning holes (1-5). The injection capillary tube (3) and the collection capillary tube (4) present a three-dimensional coaxial alignment under the combined adjustment of the adjusting holes (1-4) and the capillary tube coaxial fine adjustment assemblies (7), and
(Continued)

the capillary tube nesting assemblies (6) can realize the fixing and sealing of the capillary tubes in the chip support (1).

10 Claims, 2 Drawing Sheets

(52) U.S. Cl.
CPC ....... *B01L 3/5027* (2013.01); *B01L 3/502784* (2013.01); *B01L 2300/0819* (2013.01); *B01L 2300/0838* (2013.01); *B01L 2300/0867* (2013.01); *B01L 2300/0874* (2013.01); *B01L 2400/0406* (2013.01)

(58) Field of Classification Search
CPC ..... B01L 2300/0838; B01L 2300/0867; B01L 2300/0874; B01L 2400/0406; B01F 33/3021; B01F 23/4143
USPC ....... 137/602, 833; 422/502, 503; 210/198.2
See application file for complete search history.

(56) References Cited

U.S. PATENT DOCUMENTS 7,802,591 B2 * 9/2010 Barrow .................. B82Y 30/00 137/833
8,313,698 B2 * 11/2012 Pollack ............ G01N 27/44791 422/82.07
8,318,110 B2 * 11/2012 Blankenstein ... G01N 33/54386 436/166
8,506,803 B2 * 8/2013 Russell .............. G01N 30/7266 250/288
11,779,923 B2 * 10/2023 Kvist .................. B01F 33/3011 422/503
2003/0145894 A1 * 8/2003 Burns ..................... B01F 25/23 137/833
2011/0290009 A1 * 12/2011 Karger ............... B01J 20/28085 250/288
2012/0040472 A1 * 2/2012 Churski .............. B01F 25/4331 436/180
2012/0048882 A1 * 3/2012 Clarke ................ B01F 33/3011 422/502
2012/0108721 A1 * 5/2012 Mazutis .............. B01F 33/3011 137/1
2014/0246801 A1 9/2014 Olde Riekerink et al.
2017/0203322 A1 * 7/2017 Ivri ...................... B01J 19/0046
2020/0108393 A1 * 4/2020 Lee .................... G01N 21/6408
2020/0140628 A1 * 5/2020 Perez-Mercader ...... B01J 13/06

FOREIGN PATENT DOCUMENTS

CN 108362756 A 8/2018
CN 110665555 A 1/2020
CN 112517096 A 3/2021
CN 112619721 A 4/2021

* cited by examiner

MICROFLUIDIC CHIP CAPABLE OF FINELY ADJUSTING COAXIAL ALIGNMENT OF CAPILLARY TUBES

This application is the National Stage Application of PCT/CN2021/000215, filed on Nov. 3, 2021, which claims priority to Chinese Patent Application No. 202111168539.4, filed on Oct. 11, 2021, which is incorporated by reference for all purposes as if fully set forth herein.

TECHNICAL FIELD

The present disclosure belongs to the technical field of microfluidic chips, and particularly relates to a microfluidic chip capable of finely adjusting coaxial alignment of capillary tubes.

BACKGROUND ART

Microfluidics is the science and technology of systems that manipulate small amounts of fluids within microscale channels, and by means of such technology, micro-droplets with high monodispersity, controlled sizes, and diverse morphologies can be produced. These micro-droplets provide excellent templates for preparing highly mono-dispersed micro-particles with diversified structures, and are widely used for the fields such as delivery and controlled release of drugs, bio-templates, cell culture and micro-reactors.

The main materials for commercial droplet generator chips are polymers (COC, PMMA, PDMS). Microfluidic chips are manufactured using various methods including photolithography, molding, polymer hot-pressing molding, laser engraving, etching and the like. Microfluidic droplet generators rely on the above technologies are designed as the planar flow-focusing configuration or T-junction configuration. The planar geometry, however, suffers from many limitations and drawbacks, such as complicated manufacturing process, high processing cost, rigorous bonding method, low resistance to high temperature and organic solvents, leakage at the connections of the chips, which limits the development of the microfluidic micro-droplet technology.

In a glass capillary microfluidic chip, capillary tubes are adopted as functional units for droplet generation and collection, Glass capillary microfluidic chip was widely used due to its advantages of excellent light transmittance, high pressure resistance and bio-compatibility, stable surface properties, resistance to corrosion by the organic solvents and the like. Glass capillary microfluidic chip consists of two cylindrical glass capillary tubes with tapered ends nested within a square glass tube. By ensuring that the outer diameter of the round tubes is the same as the inner dimension of the square tube, a good alignment is achieved to form a coaxial geometry. Preparation of single-emulsion micro-droplets or double-emulsion micro-droplets with core-shell structures can be realized by such glass capillary device that combines the co-flow and flow-focusing configurations. A patent CN106622407A has provided a microfluidic chip, which involves capillaries and needles glued onto the surface of microscope slides. Such assembly type microfluidic chip can be established by manual operation. A patent CN102580799A also has proposed coaxial establishment of capillary tubes. In a technology disclosed in this patent, a micro-channel is cut in a slide, glass capillary tubes are inserted into the micro-channel, and the slide and connecting ports are bonded and sealed with an adhesive. A patent CN112517096A has disclosed a capillary tube microfluidic chip established by a needle setting platform, a needle setter, a holder and the like by preparing a chip support from plastic, metals, polymers or other materials via a 3D printing technology.

Methods for coaxially aligning and fixing capillary tubes are provided in the above technical solutions, which have the common point of modular chip assembly. It should be noted that manual operation is adopted during chip assembly, so that the problem that accurate three-dimensional coaxial alignment of the capillary tubes cannot be ensured easily happens. In addition, the adhesive will be used for fixing the capillary tubes in the chip and/or sealing the micro-channel, which is not resistant to the organic solvents, easy to cause liquid leakage. Once the chip is partially blocked or damaged in other ways, liquid cannot normally flow, so that the chip is scrapped, thereby seriously reducing the manufacturing efficiency and manufacturing quality of the chip.

In the technical content of the capillary tube microfluidic chips disclosed at present, most microfluidic chips are established in a modular splicing manner such as using glass capillary, micro-channel structure, injection structure, fixing structure, and sealing structure. Multiple sealing links are involved in such establishment mode, requirements for connectors are high, use of the adhesive cannot be avoided, and meanwhile the sealing performance of the chips is hardly ensured. Besides the coaxial alignment of the capillary tubes, fixing of the capillary tubes and sealing of the micro-channels are always a technical difficulty in the capillary tube microfluidic chips.

Based on the above technical background, researchers are expected to improve design and preparation processes of the existing glass capillary microfluidic chips. On the premise of achieving the coaxial and precise alignment of the capillaries, using non-adhesive technology for sealing, fixing and liquid feeding, ensuring chips can be disassembled, cleaned and reused, which will have high application value for promotion of the microfluidic chips and preparation of micro-droplets.

In the content of the present disclosure, due to an integrated chip support, integrated design of a micro-channel structure, an injection structure, a fixing structure and a sealing structure is realized, and the complexity of an overall structure of a chip is reduced; and meanwhile, the integrated chip support can be used in cooperation with standard connectors, the operation is convenient, and good fixing and sealing effects can be realized without using an adhesive bonding process.

SUMMARY OF THE INVENTION

In order to realize the above disclosure objectives, the present disclosure adopts the following technical solutions:

A microfluidic chip capable of finely adjusting coaxial alignment of capillary tubes includes a dispersed phase liquid inlet (2), an injection capillary tube (3), a collection capillary tube (4) and a collection port (5), and further includes an integrated chip support (1), capillary tube nesting assemblies (6) and capillary tube coaxial fine adjustment assemblies (7);

- threaded holes (1-1), sealing holes (1-2), capillary tube coaxial alignment holes (1-3), adjusting holes (1-4) and positioning holes (1-5) are symmetrically formed on two sides of the integrated chip support (1), where the threaded holes (1-1), the sealing holes (1-2) and the capillary tube coaxial alignment holes (1-3) are sequentially connected, and a continuous phase liquid inlet (1-6) and an intermediate phase liquid inlet (1-7) are further formed on the integrated chip support (1);

there are two capillary tube nesting assemblies (6) symmetrically arranged on two sides of the microfluidic chip respectively and used for fixing the injection capillary tube (3) and the collection capillary tube (4), and each of the capillary tube nesting assemblies includes a fastener (6-1), a spacer sleeve 1 (6-2), an O-shaped sealing ring (6-3), a spacer sleeve 2 (6-4) and an O-shaped adjusting ring (6-5);

there are 6 capillary tube coaxial fine adjustment assemblies (7), each of the capillary tube coaxial fine adjustment assemblies includes a set screw (7-1) and a sealing gasket (7-2), and the set screws (7-1) are inserted into the adjusting holes (1-4) after being sleeved with the sealing gaskets (7-2);

there are 6 adjusting holes (1-4), 3 adjusting holes are formed on each of the two sides of the integrated chip support (1) and arranged at 120 degrees, and the adjusting holes communicate with the sealing holes (1-2), and are right opposite to the O-shaped adjusting rings (6-5); and the injection capillary tube (3) and the collection capillary tube (4) present a three-dimensional coaxial alignment under the combined adjustment of the adjusting holes (1-4) and the capillary tube coaxial fine adjustment assemblies (7).

In the design of the integrated chip support (1) of the present disclosure, the threaded holes (1-1), the sealing holes (1-2) and the capillary tube coaxial alignment holes (1-3) are sequentially connected and symmetric left and right, to form a micro-channel structure of the chip. In an assembly process of the chip, the injection capillary tube (3) is sequentially sleeved with the fastener (6-1), the spacer sleeve 1 (6-2), the O-shaped sealing ring (6-3), the spacer sleeve 2 (6-4) and the O-shaped adjusting ring (6-5) from a tapered end side, and then penetrates through the threaded hole (1-1) and the sealing hole (1-2) from one side of the micro-channel structure to reach a middle of the capillary tube coaxial alignment hole (1-3), and fixing of the injection capillary tube (3) and sealing of one side of the micro-channel structure are realized by screwing the fastener (6-1) and pressing the O-shaped sealing ring (6-3); and similarly, the collection capillary tube (4) is sequentially sleeved with the other group of the fastener (6-1), the spacer sleeve 1 (6-2), the O-shaped sealing ring (6-3), the spacer sleeve 2 (6-4) and the O-shaped adjusting ring (6-5) from a tapered end side, and then penetrates through the threaded hole (1-1) and the sealing hole (1-2) in this side from the other side of the micro-channel structure to reach a middle of the capillary tube coaxial alignment hole (1-3), and fixing of the collection injection capillary tube (4) and sealing of this side of the micro-channel structure are realized by screwing the fastener (6-1) to adjust a relative distance between tapered ends of the collection capillary tube (4) and the injection capillary tube (3) and pressing the O-shaped sealing ring (6-3).

It should be noted that since the adjusting holes (1-4) communicate with the sealing holes (1-2), when the set screws (7-1) in the capillary tube coaxial fine adjustment assemblies (7) are inserted into the adjusting holes (1-4) after being sleeved with the sealing gaskets (7-2), the set screws (7-1) are right opposite to and tightly make contact with the O-shaped adjusting rings (6-5) sleeved on the capillary tubes in the sealing holes (1-2) by screwing the set screws (7-1). Due to the design that 3 adjusting holes (1-4) are distributed at 120 degrees, extrusion force applied to peripheries of the O-shaped adjusting rings (6-5) by the set screws (7-1) can be uniformly distributed, accordingly, contact force applied to the tapered end of the capillary tubes by the O-shaped adjusting rings (6-5) is uniformly distributed, coaxial positions of the injection capillary tube (3) and the collection capillary tube (4) are finely adjusted, accurate three-dimensional coaxial alignment of the capillary tubes is finally realized, and meanwhile the sealing gaskets (7-2) are used for sealing the adjusting holes (1-4), thereby avoiding liquid leakage. In the whole, the capillary tube coaxial fine adjustment assemblies (7) can be arranged at any positions where the capillary tubes can be clamped. In the present disclosure, the capillary tube coaxial fine adjustment assemblies are located in a region close to the tapered ends of the capillary tubes, which aims at better adjusting coaxial alignment of tapered ends of the capillary tubes.

The microfluidic chip according to the present disclosure is further characterized in that cross sections of the injection capillary tube (3) and the collection capillary tube (4) are round, the tapered ends of the injection capillary tube and the collection capillary tube are arranged facing each other.

An initial raw material has two flat port ends either for the injection capillary tube (3) or for the collection capillary tube (4). One section is made into a tapered end in a common capillary tube pulling mode. Tapers of the tapered ends are usually less than 90 degrees, or may be greater than 90 degrees. It is ensured that gaps can be naturally formed between the tapers and nesting structures so that a continuous phase or an intermediate phase can smoothly flow therein conveniently. By taking price, easy obtaining and the like into consideration, in the present disclosure, sizes of the injection capillary tube (3) and the collection capillary tube (4) are preferably 1.0 mm*0.58 mm (external diameter*internal diameter). A technician can increase or decrease the sizes of the injection capillary tube (3) and the collection capillary tube (4) according to the specificity of a special solution system or nonhomogeneous liquid.

The microfluidic chip according to the present disclosure is further characterized in that the continuous phase liquid inlet (1-6) and the intermediate phase liquid inlet (1-7) communicate with the capillary tube coaxial alignment holes (1-3) in a right opposite manner on an injection capillary tube side and a collection capillary tube side respectively; the dispersed phase liquid inlet (2) is located at the flat port end of the injection capillary tube (3); and the collection port (5) is located at the flat port end of the collection capillary tube (4).

The microfluidic chip according to the present disclosure is further characterized in that an internal diameter of the tapered end of the injection capillary tube (3) ranges from 50 μm to 80 μm, and an internal diameter of the tapered end of the collection capillary tube (4) ranges from 100 μm to 160 μm.

Usually, the internal diameter of the tapered end of the collection capillary tube is 2 times that of the injection capillary tube. Due to such design, a generation behavior of micro-droplets can be adjusted within a wider flow rate range, so that micro-droplets with a wider size distribution range are obtained. As for a common material solution system, if the internal diameter of the tapered end of the injection capillary tube (3) is too small (<50 μm), the machining difficulty of the capillary tubes will be increased, and fluid with high viscosity hardly passes; and if the internal diameter is too large (>80 μm), micro-droplets with small sizes cannot be easily generated.

The microfluidic chip according to the present disclosure is further characterized in that an interval between the tapered ends of the injection capillary tube (3) and the collection capillary tube (4) ranges from 50 μm to 100 μm. Within such interval range selected in the present disclosure, multi-phase fluids in the chip can be emulsified under comprehensive acting force such as interfacial tension, viscous force and inertia force, so that preparation of the micro-droplets is more stable.

The microfluidic chip according to the present disclosure is further characterized in that sizes of the threaded holes (1-1) are M8*1.0, diameters of the sealing holes (1-2) are 4.0 mm, and diameters of the capillary tube coaxial alignment holes (1-3) are 1.5 mm.

The microfluidic chip according to the present disclosure is further characterized in that sizes of the adjusting holes (1-4) are M6.

In the disclosure content of the present patent, machining sizes of the threaded holes (1-1), the sealing holes (1-2) and the adjusting holes (1-4) are sizes of through holes of common standard parts in mechanical design, which can be correspondingly adjusted according to specific embodiments. The diameters of the capillary tube coaxial alignment holes (1-3) are 1.5 mm, which are defined by a common capillary tube size of 1.0 mm*0.58 mm (external diameter*internal diameter). Theoretically, the diameters of the capillary tube coaxial alignment holes (1-3) should be greater than 1.0 mm, however, in comprehensive consideration of machining and sealing, the selected machining size is 1.5 mm. If capillary tubes with other sizes are selected and used, the diameters of the capillary tube coaxial alignment holes (1-3) may correspondingly change.

A method for coaxial alignment of the injection capillary tube and the collection capillary tube in the prior art is as follows: under the condition that an external diameter of a round capillary tube is matched with an inner edge length of a square capillary tube or an internal diameter of a micro-channel, it is usually impossible to ensure accurate three-dimensional coaxial alignment of the injection capillary tube and the collection capillary tube in a simply combined installation manner due to size errors of the capillary tubes and the micro-channel and manual operation. In the disclosure content of the present patent, the coaxial alignment of the injection capillary tube (3) and the collection capillary tube (4) depends on the capillary tube coaxial fine adjustment assemblies (7), so that the diameters of the threaded holes (1-1) and the sealing holes (1-2) are not limited by the sizes of the capillary tubes, greatly widening the machining range of the size of the micro-channel and reducing the machining difficulty. In conclusion, in the present disclosure, the capillary tube coaxial fine adjustment assemblies (7) have the effects of sealing, fixing and adjusting at the same time, all of which are realized by adopting the capillary tube coaxial fine adjustment assemblies (7), so that the integrated chip support can be made of glass, which not only can utilize all advantages of the glass, but also reduces the high-precision machining difficulty of the glass.

The microfluidic chip according to the present disclosure is further characterized in that external threads of the fasteners (6-1) are matched with internal threads of the threaded holes (1-1), sizes of the spacer sleeves 1 (6-2) and the spacer sleeves 2 (6-4) are 4.0 mm*2.0 mm (external diameter*internal diameter), and sizes of the O-shaped sealing rings (6-3) and the O-shaped adjusting rings (6-5) are 4.0 mm*1.5 mm (external diameter*internal diameter).

In the microfluidic chip according to the present disclosure, materials of the fasteners (6-1), the spacer sleeves 1 (6-2), the spacer sleeves 2 (6-4) and the set screws (6-2) used therein may be selected from copper, aluminum, stainless steel or the like; and materials of the O-shaped sealing rings (6-3), the O-shaped adjusting rings (6-5) and the sealing gaskets (7-2) may be selected from fluorine rubber, silicone rubber or nitrile rubber.

The microfluidic chip according to the present disclosure is further characterized in that the integrated chip support (1) is made of the glass, and may be selected from a cylinder or a hexagonal prism, preferably, the hexagonal prism. Due to the design of the cylinder or the hexagonal prism, the chip support can be easily rotated, such that the coaxial alignment of the capillary tubes can be conveniently adjusted at multiple angles. However, in consideration of machining convenience, fixing of the chip support and observation under an optical microscope, the chip support is preferably the hexagonal prism.

In the present disclosure, the material of the integrated chip support (1) is selected from the glass, for the reason that the glass has excellent high pressure resistance and biocompatibility and flexible surface modification, resistance to corrosion by organic solvents and the like, and especially has good light transmittance, it can be used in combination with a high-speed online microscopic experimental platform so that the micro-droplets can be conveniently observed and controlled in real time, and these advantages are not realized at the same time by other materials. From the perspective of current technological level, when the chip support is made of the glass, raw material and machining costs of the chip support are basically equivalent to those of a chip support made of stainless steel, brass or aluminum or other metals. If it is necessary to reduce the cost of the integrated chip, the easier solution is to use a spliced support rather than an integrated support. In a splicing solution, a middle observation region may be reserved as the glass, other regions are made of materials such as the glass, metals, plastic or ceramics, and all the regions are locked by a mechanical structure or bonded by an adhesive.

The microfluidic chip according to the present disclosure is further characterized in that the continuous phase liquid inlet (1-6), the intermediate phase liquid inlet (1-7) and the dispersed phase liquid inlet (2) in the chip can be used in combination with a peristaltic pump, an injection pump or a pressure controller, so as to control a flow rate of each phase of liquid; and the collection port (5) can be connected to a photo-curing apparatus, a heater or a cryogenic freezer, so as to enable the micro-droplets obtained to undergo further processing.

The present disclosure has the beneficial effects:

(1) The relative positions of the capillary tubes can be adjusted at multiple angles by the capillary coaxial fine adjustment structures of the present disclosure, ensuring accurate three-dimensional coaxial alignment of the capillary tubes;

(2) the capillary tubes are not fixed and sealed in an adhesive manner in the micro-channel by the capillary tube nesting assemblies of the present disclosure, and the chip is detachable, washable and reusable;

(3) the integrated chip support of the present disclosure is made of the glass, which has high chemical stability, can conveniently cooperate with an optical observation system, easily realizes surface modification, and has wide temperature and pressure resistance ranges;

(4) the chip of the present disclosure can be easily produced industrially on a large scale.

BRIEF DESCRIPTION OF THE DRAWINGS

In order to be illustrative, instead of being limitative, the present disclosure will be described now according to preferred embodiments of the present disclosure, especially reference accompanying drawings, where.

Figure 1:
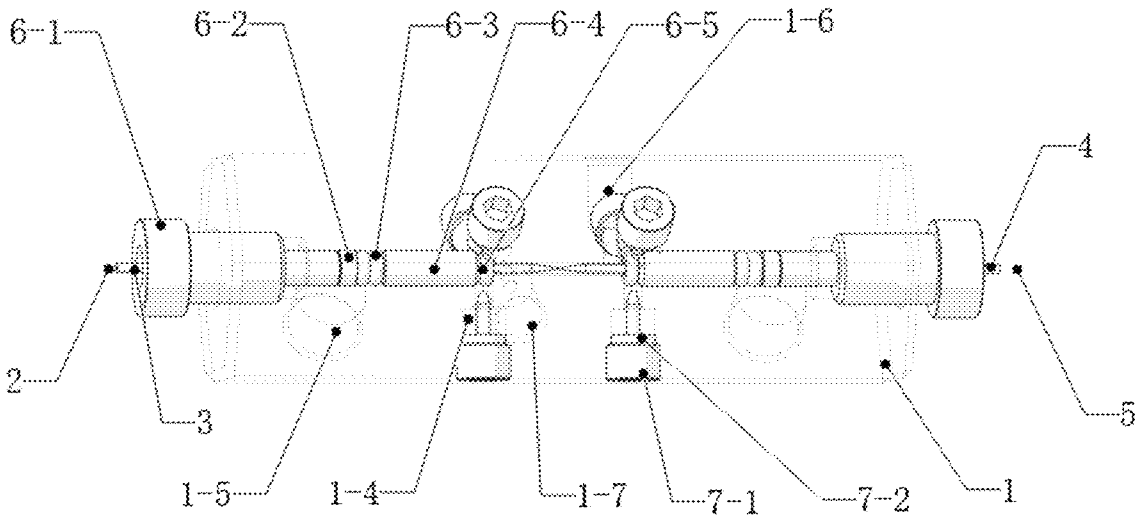
FIG. 1 is a schematic diagram of integral assembly of a microfluidic chip capable of finely adjusting coaxial alignment of capillary tubes according to the present disclosure.
Figure 2:
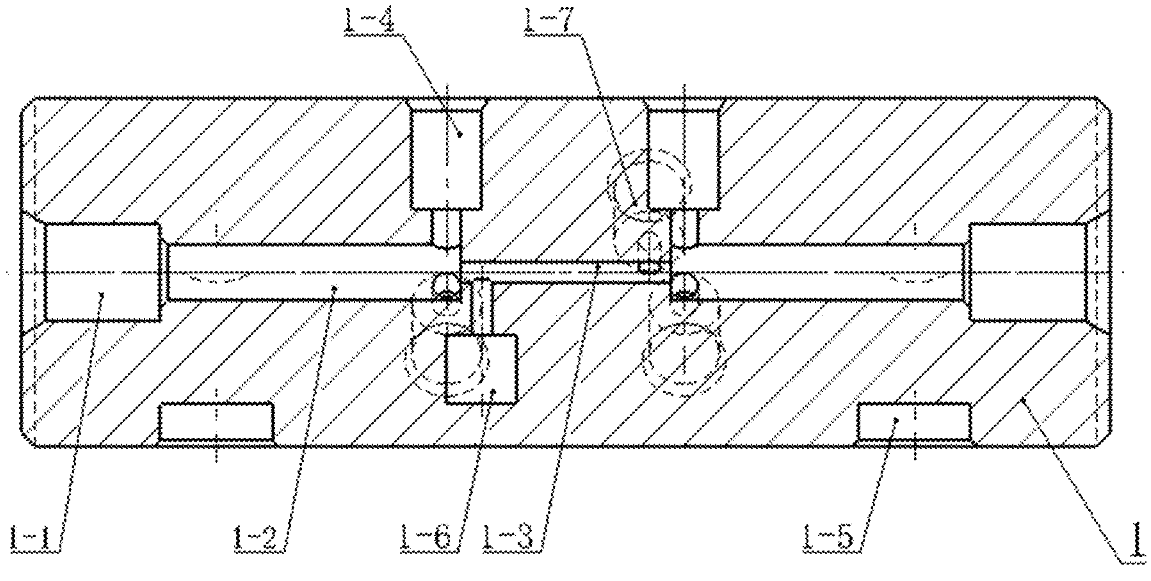
FIG. 2 is a schematic structural diagram of an integrated chip support.
Figure 3:
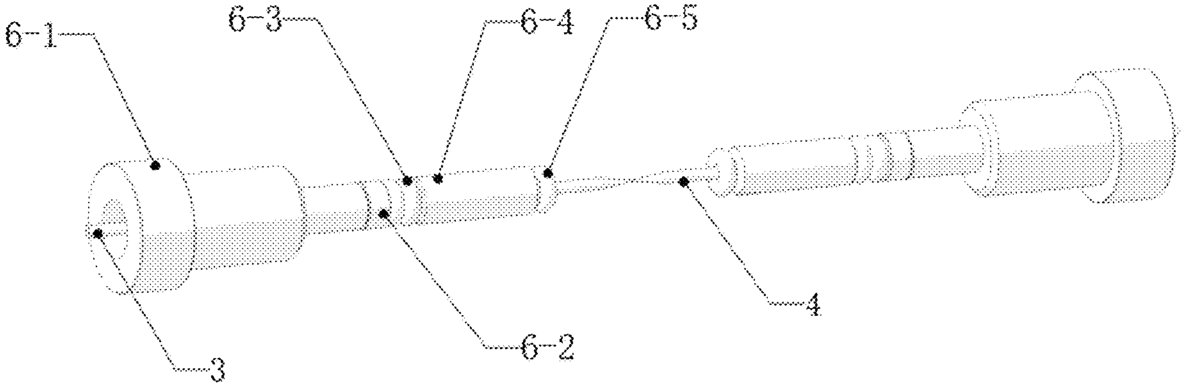
FIG. 3 is a schematic diagram of assembly of capillary tubes and capillary tube nesting assemblies.
Figure 4:
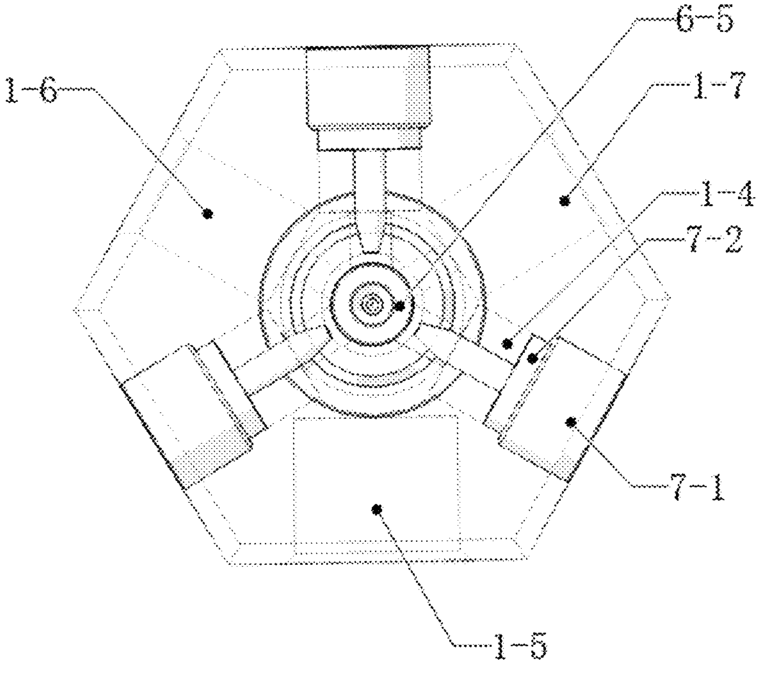
FIG. 4 is a side view after capillary tube coaxial fine adjustment assemblies are arranged into an integrated chip support.

Reference signs in the drawings are shown as follows:

- 1: integrated chip support; 1-1: threaded hole; 1-2: sealing hole; 1-3: capillary tube coaxial alignment hole; 1-4: adjusting hole; 1-5: positioning hole; 1-6: continuous phase liquid inlet; 1-7: intermediate phase liquid inlet;
- 2: dispersed phase liquid inlet;
- 3: injection capillary tube;
- 4: collection capillary tube;
- 5: collection port;
- 6: capillary tube nesting assembly; 6-1: fastener; 6-2: spacer sleeve 1; 6-3: O-shaped sealing ring; 6-4: spacer sleeve 2; 6-5: O-shaped adjusting ring;
- 7: capillary tube coaxial fine adjustment assembly; 7-1: set screw; 7-2: sealing gasket.

DETAILED DESCRIPTION OF THE INVENTION

The present disclosure is further described below with reference to specific embodiments and accompanying drawings.

Embodiment 1: Preparation of Water-In-Oil-In-Water (W/O/W) Type Micro-Droplets by Using a Microfluidic Chip Capable of Finely Adjusting Coaxial Alignment of Capillary Tubes Specific Implementation Steps:

1. Assembly of the Chip

A round capillary tube is machined into two sections of capillary tubes with lengths being 5 cm and with tapered ends by a capillary tube pulling instrument, the tapered ends of the capillary tubes are ground till inner diameters are 55 μm and 110 μm, and the capillary tubes are used as an injection capillary tube (3) and a collection capillary tube (4) respectively. The obtained glass capillary tubes are cleaned and dried to remove residual glass particles, and the collection capillary tube (4) is hydrophobically treated with octadecyltrimethoxysilane, cleaned with ethanol, and aired for later use.

The hydrophobically treated injection capillary tube (3) is sequentially sleeved with a fastener (6-1), a spacer sleeve 1 (6-2), an O-shaped sealing ring (6-3), a spacer sleeve 2 (6-4) and an O-shaped adjusting ring (6-5) from a tapered end side, and then penetrates through a threaded hole (1-1) and a sealing hole (1-2) from one side of a hexagonal-prism-shaped chip support (1) to reach a middle of a capillary tube coaxial alignment hole (1-3) with a diameter being 1.5 mm, and fixing of the injection capillary tube (3) and sealing of a flat port side of a micro-channel structure are realized by screwing the fastener (6-1) and pressing the O-shaped sealing ring (6-3); and the collection capillary tube (4) is sequentially sleeved with the other group of the fastener (6-1), the spacer sleeve 1 (6-2), the O-shaped sealing ring (6-3), the spacer sleeve 2 (6-4) and the O-shaped adjusting ring (6-5) from a tapered end side, and then penetrates through the threaded hole (1-1) and the sealing hole (1-2) in this side from the other side of the chip support (1) to reach a middle of the capillary tube coaxial alignment hole (1-3), an interval between tapered ends of the injection capillary tube (3) and the collection capillary tube (4) is adjusted to be 70 μm via an optical microscope by screwing the fastener (6-1), and the collection capillary tube (4) is screwed down and fixed by pressing the O-shaped sealing ring (6-3); where materials of the O-shaped sealing rings (6-3) and the O-shaped adjusting rings (6-5) are selected from silicone rubber.

3 set screws (7-1) are inserted into 3 corresponding adjusting holes (1-4) in one side of the hexagonal-prism-shaped chip support (1) respectively after being sleeved with sealing gaskets (7-2), and are right opposite to the O-shaped adjusting ring (6-5) sleeved on the injection capillary tube (3); similarly, 3 set screws (7-1) sleeved with the sealing gaskets (7-2) are inserted into 3 adjusting holes (1-4) in the other side respectively, and are right opposite to the O-shaped adjusting ring (6-5) sleeved on the collection capillary tube (4); and relative angles of the injection capillary tube (3) and the collection capillary tube (4) in the micro-channel are adjusted respectively via observation by the optical microscope by screwing the 3 set screws (7-1) arranged at 120 degrees and pressing the O-shaped adjusting ring (6-5), and the hexagonal-prism-shaped chip support (1) is sequentially rotated to adjust relative positions of the capillary tubes at different angles, finally ensuring 360 degrees coaxial alignment of the injection capillary tube (3) and the collection capillary tube (4).

2. Preparation of Micro-Droplets

In the embodiment, a 2 wt % PVA aqueous solution is selected as a dispersed phase, a 1 wt % Span 80 liquid paraffin solution is selected as an intermediate phase, a 5 wt % PVA aqueous solution is selected as a continuous phase, the dispersed phase, intermediate phase and continuous phase solutions are filled into 3 screw injectors respectively, and the screw injectors are installed on an injection pump.

Two ends of a PTFE tubing with an external diameter being 1/16" are sleeved with a PEEK connector with an M6 thread and a pressing ring, bottoms of the pressing rings are flush with end faces of the tubing, one end is connected with the screw injector filled with the dispersed phase solution by a Luer taper, and the other end is connected with the fastener (6-1) on one side of the injection capillary tube (3); and similarly, the screw injectors filled with the intermediate phase solution and the continuous phase solution are connected with an intermediate phase liquid inlet (1-7) and a continuous phase liquid inlet (1-6) of the chip by PEEK connectors and PTFE tubings respectively.

One end of a PTFE tubing with an external diameter of 1/16" is sleeved with a PEEK connector with an M6 thread and a pressing ring and connected with the fastener (6-1) on one side of the collection capillary tube (4), so that a collection port (5) is connected with the PTFE tubing, and the other end of the PTFE tubing can be put into a glass beaker.

Flow rates of the dispersed phase, the intermediate phase and the continuous phase are set as 0.3-0.4 ml/h, 0.2-0.5 ml/h and 1.6-2.0 ml/h respectively, the injection pump is switched on, the flow rate of each phase is adjusted, and generation of the micro-droplets in the micro-channel is observed under the optical microscope. When stable W/O/W double-emulsion micro-droplets are formed in the collection capillary tube (4), the micro-droplets are collected by a glass beaker filled with a 5 wt % PVA aqueous solution.

After the micro-droplets are prepared, the chip should be cleaned for next use, and ethanol and deionized water are used as cleaning fluids. Firstly, injection of three-phase fluids is stopped, and the injectors used by the three-phase fluids are replaced with injectors filled with the ethanol. The drive injection pump of the three-phase fluids is switched on till an oil-phase solution or an oil-water mixture in the chip is completely removed, the injectors are replaced with injectors filled with the deionized water, the chip is repeatedly cleaned and then continues to be cleaned with the ethanol, and the chip can be reused after being completely cleaned and aired.

When the capillary tubes in the chip are blocked, the capillary tubes are detached by screwing capillary tube nesting assemblies (6) and loosening the set screws (7-1), and after the capillary tubes are dredged and cleaned, the chip can continue to be assembled and used.

Embodiment 2: Preparation of Oil-In-Water-In-Oil (O/W/O) Type Micro-Droplets by Using a Microfluidic Chip Capable of Finely Adjusting Coaxial Alignment of Capillary Tubes The embodiment is basically the same as Embodiment 1, and mainly differs from it in materials, sizes and structures of some assemblies during chip assembly, as well as compositions of three-phase fluids.

Specific Implementation Steps:

1. Assembly of the Chip

A round capillary tube is machined into two sections of capillary tubes with lengths being 5 cm and with tapered ends by a capillary tube pulling instrument, the tapered ends of the capillary tubes are ground till inner diameters are 60 μm and 120 μm, and the capillary tubes are used as an injection capillary tube (3) and a collection capillary tube (4) respectively. The obtained glass capillary tubes are cleaned and dried to remove residual glass particles, the injection capillary tube (3) is hydrophilically treated with a Piranha solution ($H_2SO_4$: $H_2O_2$=7/3, V/V), the collection capillary tube (4) is hydrophobically treated with octadecyltrimethoxysilane, and then the capillary tubes are respectively cleaned with ethanol and aired for later use.

The hydrophilically treated injection capillary tube (3) is sequentially sleeved with a fastener (6-1), a spacer sleeve 1 (6-2), an O-shaped sealing ring (6-3), a spacer sleeve 2 (6-4) and an O-shaped adjusting ring (6-5) from a tapered end side, and then penetrates through a threaded hole (1-1) and a sealing hole (1-2) from one side of a micro-channel structure of a hexagonal-prism-shaped chip support (1) to reach a middle of a capillary tube coaxial alignment hole (1-3) with a diameter being 1.5 mm, and fixing of the injection capillary tube (3) and sealing of this side of the micro-channel structure are realized by screwing the fastener (6-1) and pressing the O-shaped sealing ring (6-3); and the hydrophobically treated collection capillary tube (4) is sequentially sleeved with the other group of the fastener (6-1), the spacer sleeve 1 (6-2), the O-shaped sealing ring (6-3), the spacer sleeve 2 (6-4) and the O-shaped adjusting ring (6-5) from a tapered end side, and then penetrates through a threaded hole (1-1) and a sealing hole (1-2) in this side from the other side of the micro-channel structure to reach a middle of the capillary tube coaxial alignment hole (1-3), an interval between tapered ends of the injection capillary tube (3) and the collection capillary tube (4) is adjusted to be 100 μm via an optical microscope by screwing the fastener (6-1), and the collection capillary tube (4) is screwed down and fixed by pressing the O-shaped sealing ring (6-3); where materials of the O-shaped sealing rings (6-3) and the O-shaped adjusting rings (6-5) are selected from fluorine rubber.

3 set screws (7-1) are inserted into 3 corresponding adjusting holes (1-4) in one side of the hexagonal-prism-shaped chip support (1) respectively after being sleeved with sealing gaskets (7-2), and are right opposite to the O-shaped adjusting ring (6-5) sleeved on the injection capillary tube (3); similarly, 3 set screws (7-1) sleeved with the sealing gaskets (7-2) are inserted into 3 adjusting holes (1-4) in the other side respectively, and are right opposite to the O-shaped adjusting ring (6-5) sleeved on the collection capillary tube (4); and relative angles of the injection capillary tube (3) and the collection capillary tube (4) in the micro-channel are adjusted respectively via observation by the optical microscope by screwing the 3 set screws (7-1) arranged at 120 degrees and pressing the O-shaped adjusting ring (6-5), and the hexagonal-prism-shaped chip support (1) is sequentially rotated to adjust relative positions of the capillary tubes at different angles, finally ensuring 360 degrees coaxial alignment of the injection capillary tube (3) and the collection capillary tube (4).

2. Preparation of Micro-Droplets

In the embodiment, a 8 wt % PLGA dichloromethane solution is selected as a dispersed phase, an aqueous solution containing 1 wt % PVA aqueous solution and 0.5 wt % sodium alginate is selected as an intermediate phase, a 10 wt % Span 80 methylbenzene solution is selected as a continuous phase, the dispersed phase, intermediate phase and continuous phase solutions are filled into 3 screw injectors respectively, and the screw injectors are installed on an injection pump.

Two ends of a PEEK tubing with an external diameter being 1/16" are each sleeved with a PEEK connector with an M6 thread and a pressing ring, bottoms of the pressing rings are flush with end faces of the tubing, one end is connected with the screw injector filled with the dispersed phase solution by a Luer taper, and the other end is connected with the fastener (6-1) on one side of the injection capillary tube (3); and similarly, the screw injectors filled with the intermediate phase solution and the continuous phase solution are connected with an intermediate phase liquid inlet (1-7) and a continuous phase liquid inlet (1-6) of the chip by PEEK connectors and PTFE tubings respectively.

One end of a PEEK tubing with an external diameter of 1/16" is sleeved with a PEEK connector with an M6 thread and a pressing ring and connected with the fastener (6-1) on one side of the collection capillary tube (4), so that a collection port (5) is connected with the PTFE tubing, and the other end of the PTFE tubing can be put into a glass beaker.

Flow rates of the dispersed phase, the intermediate phase and the continuous phase are set as 0.4-0.8 ml/h, 0.4-0.85 ml/h and 2.0-6.0 ml/h respectively, the injection pump is switched on, the flow rate of each phase is adjusted, and generation of the micro-droplets in the micro-channel is observed under the optical microscope. When stable O/W/O double-emulsion micro-droplets are formed in the collection capillary tube (4), the micro-droplets are collected by a glass beaker filled with a 20 mM calcium chloride aqueous solution.

After the micro-droplets are prepared, the chip should be cleaned for next use. Firstly, injection of three-phase fluids is stopped, and the injectors used by the three-phase fluids are replaced with injectors filled with dichloromethane. The drive injection pump of the three-phase fluids is switched on till a residual solution in the chip is completely removed, the injectors are replaced with injectors filled with ethanol, the chip is repeatedly cleaned for 2 times, and the chip can be reused after being completely cleaned and aired.

When the capillary tubes in the chip are blocked, the capillary tubes are detached by screwing capillary tube nesting assemblies (6) and loosening the set screws (7-1), and after the capillary tubes are dredged and cleaned, the chip can continue to be assembled and used.

Embodiment 3: Preparation of Water-In-Oil-In-Water (W/O/W) Type Micro-Droplets by Using a Microfluidic Chip Capable of Finely Adjusting Coaxial Alignment of Capillary Tubes The embodiment is basically the same as Embodiment 1 and Embodiment 2, and mainly differs from them in materials, shapes, sizes and structures of some assemblies during chip assembly, as well as compositions of three-phase fluids.

Specific Implementation Steps:

1. Assembly of the Chip

A round capillary tube is machined into two sections of capillary tubes with lengths being 5 cm and with tapered ends in one ends by a capillary tube pulling instrument, the tapered ends of the capillary tubes are ground till inner diameters are 75 μm and 150 μm, and the capillary tubes are used as an injection capillary tube (3) and a collection capillary tube (4) respectively. The obtained glass capillary tubes are cleaned and dried to remove residual glass particles, and the injection capillary tube (3) is hydrophobically treated with octadecyltrimethoxysilane, then cleaned with ethanol, and aired for later use.

The hydrophobically treated injection capillary tube (3) is sequentially sleeved with a fastener (6-1), a spacer sleeve 1 (6-2), an O-shaped sealing ring (6-3), a spacer sleeve 2 (6-4) and an O-shaped adjusting ring (6-5) from a tapered end side, and then penetrates through a threaded hole (1-1) and a sealing hole (1-2) from one side of a micro-channel structure of a cylindrical chip support (1) to reach a middle of a capillary tube coaxial alignment hole (1-3) with a diameter being 1.5 mm, and fixing of the injection capillary tube (3) and sealing of this side of the micro-channel structure are realized by screwing the fastener (6-1) and pressing the O-shaped sealing ring (6-3); and the collection capillary tube (4) is sequentially sleeved with the other group of the fastener (6-1), the spacer sleeve 1 (6-2), the O-shaped sealing ring (6-3), the spacer sleeve 2 (6-4) and the O-shaped adjusting ring (6-5) from a tapered end side, and then penetrates through the threaded hole (1-1) and the sealing hole (1-2) in this side from the other side of the micro-channel structure to reach a middle of the capillary tube coaxial alignment hole (1-3), an interval between tapered ends of the injection capillary tube (3) and the collection capillary tube (4) is adjusted to be 100 μm via an optical microscope by screwing the fastener (6-1), and the collection capillary tube (4) is screwed down and fixed by pressing the O-shaped sealing ring (6-3); where materials of the O-shaped sealing rings (6-3) and the O-shaped adjusting rings (6-5) are selected from nitrile rubber. 3 set screws (7-1) are inserted into 3 corresponding adjusting holes (1-4) in one side of the cylindrical chip support (1) respectively after being sleeved with sealing gaskets (7-2), and are right opposite to the O-shaped adjusting ring (6-5) sleeved on the injection capillary tube (3); and similarly, the 3 set screws (7-1) sleeved with the sealing gaskets (7-2) are inserted into 3 adjusting holes (1-4) in the other side respectively, and are right opposite to the O-shaped adjusting ring (6-5) sleeved on the collection capillary tube (4); and relative angles of the injection capillary tube (3) and the collection capillary tube (4) in the micro-channel are adjusted respectively via observation by the optical microscope by screwing the 3 set screws (7-1) arranged at 120 degrees and pressing the O-shaped adjusting ring (6-5), and the cylindrical chip support (1) is sequentially rotated to adjust relative positions of the capillary tubes at different angles, finally ensuring 360 degrees coaxial alignment of the injection capillary tube (3) and the collection capillary tube (4).

2. Preparation of Micro-Droplets

In the embodiment, a 1 wt % PVA aqueous solution is selected as a dispersed phase, a 4-cyano-4'-pentylbiphenyl (a liquid crystal system being a mobile phase at room temperature, not dissolved in water) is selected as an intermediate phase, an aqueous solution containing 1 wt % PVA aqueous solution and 60 wt % glycerol is selected as a continuous phase, the dispersed phase, intermediate phase and continuous phase solutions are filled into 3 screw injectors respectively, and the screw injectors are installed on an injection pump.

Two ends of a PEEK tubing with an external diameter being 1⁄16" are each sleeved with a PEEK connector with an M6 thread and a pressing ring, bottoms of the pressing rings are flush with end faces of the tubing, one end is connected with the screw injector filled with the dispersed phase solution by a Luer taper, and the other end is connected with the fastener (6-1) on one side of the injection capillary tube (3); and similarly, the screw injectors filled with the intermediate phase solution and the continuous phase solution are connected with an intermediate phase liquid inlet (1-7) and a continuous phase liquid inlet (1-6) of the chip by PEEK connectors and PTFE tubings respectively.

One end of a PEEK tubing with an external diameter of 1⁄16" is sleeved with a PEEK connector with an M6 thread and a pressing ring and connected with the fastener (6-1) on one side of the collection capillary tube (4), so that a collection port (5) is connected with the PTFE tubing, and the other end of the PTFE tubing can be put into a glass beaker.

Flow rates of the dispersed phase, the intermediate phase and the continuous phase are set as 0.1-0.5 ml/h, 0.25-0.5 ml/h and 1.0-5.0 ml/h respectively, the injection pump is switched on, the flow rate of each phase is adjusted, and generation of the micro-droplets in the micro-channel is observed under the optical microscope. When stable W/O/W double-emulsion micro-droplets are formed in the collection capillary tube (4), the micro-droplets are collected by a glass beaker filled with a 1 wt % PVA aqueous solution and 60 wt % glycerol aqueous solution.

After the micro-droplets are prepared, the chip should be cleaned for next use. Firstly, injection of three-phase fluids is stopped, and the injectors used by the three-phase fluids are replaced with injectors filled with the ethanol. The drive injection pump of the three-phase fluids is switched on till the liquid crystal system or other mixtures in the chip are completely removed, the injectors are replaced with injectors filled with deionized water, the chip is repeatedly cleaned and then continues to be cleaned with ethanol, and the chip can be reused after being completely cleaned and aired.

When the capillary tubes in the chip are blocked, the capillary tubes are detached by screwing capillary tube nesting assemblies (6) and loosening the set screws (7-1), and after the capillary tubes are dredged and cleaned, the chip can continue to be assembled and used.

The above specific implementations do not constitute a limitation to the scope of protection of the present disclosure. Those skilled in the art should understand that various modifications, combinations, sub-combinations and replacements can occur depending on design requirements and other factors. Any modification, equivalent replacement, improvement and the like made within the spirit and principle of the present disclosure should fall within the scope of protection of the present disclosure.

The invention claimed is:

1. A microfluidic chip capable of finely adjusting coaxial alignment of capillary tubes, comprising a dispersed phase liquid inlet (2), an injection capillary tube (3), a collection capillary tube (4) and a collection port (5), further comprising an integrated chip support (1), capillary tube nesting assemblies (6) and capillary tube coaxial fine adjustment assemblies (7);

wherein threaded holes (1-1), sealing holes (1-2), capillary tube coaxial alignment holes (1-3), adjusting holes (1-4) and positioning holes (1-5) are symmetrically formed on two sides of the integrated chip support (1), wherein the threaded holes (1-1), the sealing holes (1-2) and the capillary tube coaxial alignment holes (1-3) are sequentially connected; a continuous phase liquid inlet (1-6) and an intermediate phase liquid inlet (1-7) are further formed on the integrated chip support (1);

there are two capillary tube nesting assemblies (6) arranged on two sides of the microfluidic chip respectively and used for fixing the injection capillary tube (3) and the collection capillary tube (4), and each of the capillary tube nesting assemblies comprises a fastener (6-1), a spacer sleeve 1 (6-2), an O-shaped sealing ring (6-3), a spacer sleeve 2 (6-4) and an O-shaped adjusting ring (6-5);

there are 6 capillary tube coaxial fine adjustment assemblies (7), each of the capillary tube coaxial fine adjustment assemblies comprises a set screw (7-1) and a sealing gasket (7-2), and the set screws (7-1) are inserted into the adjusting holes (1-4) after being sleeved with the sealing gaskets (7-2);

there are 6 adjusting holes (1-4), 3 adjusting holes are formed on each of the two sides of the integrated chip support (1) and arranged at 120 degrees, and the adjusting holes communicate with the sealing holes (1-2), and are right opposite to the O-shaped adjusting rings (6-5); and the injection capillary tube (3) and the collection capillary tube (4) present a three-dimensional coaxial alignment under the combined adjustment of the adjusting holes (1-4) and the capillary tube coaxial fine adjustment assemblies (7).

2. The microfluidic chip according to claim 1, wherein cross sections of the injection capillary tube (3) and the collection capillary tube (4) are round, opposite ends of the injection capillary tube and the collection capillary tube are tapered ends, and the other ends are flat port ends.

3. The microfluidic chip according to claim 1, wherein the continuous phase liquid inlet (1-6) and the intermediate phase liquid inlet (1-7) communicate with the capillary tube coaxial alignment holes (1-3) in a right opposite manner on an injection capillary tube side and a collection capillary tube side respectively; the dispersed phase liquid inlet (2) is located at a flat port end of the injection capillary tube (3); and the collection port (5) is located at a flat port end of the collection capillary tube (4).

4. The microfluidic chip according to claim 1, wherein an internal diameter of a tapered end of the injection capillary tube (3) ranges from 50 μm to 80 μm, and an internal diameter of the tapered end of the collection capillary tube (4) ranges from 100 μm to 160 μm.

5. The microfluidic chip according to claim 1, wherein an interval between opposite tapered ends of the injection capillary tube (3) and the collection capillary tube (4) ranges from 50 μm to 100 μm.

6. The microfluidic chip according to claim 1, wherein sizes of the threaded holes (1-1) are M8*1.0, diameters of the sealing holes (1-2) are 4.0 mm, and diameters of the capillary tube coaxial alignment holes (1-3) are 1.5 mm.

7. The microfluidic chip according to claim 1, wherein sizes of the adjusting holes (1-4) are M6.

8. The microfluidic chip according to claim 1, wherein external threads of the fasteners (6-1) are matched with internal threads of the threaded holes (1-1), sizes of the spacer sleeves 1 (6-2) and the spacer sleeves 2 (6-4) are 4.0 mm*2.0 mm (external diameter*internal diameter), and sizes of the O-shaped sealing rings (6-3) and the O-shaped adjusting rings (6-5) are 4.0 mm*1.5 mm (external diameter*internal diameter).

9. The microfluidic chip according to claim 1, wherein the integrated chip support (1) is made of glass, and selected from a cylinder or a hexagonal prism, preferably, the hexagonal prism.

10. The microfluidic chip according to claim 1, wherein the continuous phase liquid inlet (1-6), the intermediate phase liquid inlet (1-7) and the dispersed phase liquid inlet (2) in the chip can be used in combination with a peristaltic pump, an injection pump or a pressure controller, so as to control a flow rate of each phase of liquid; and the collection port (5) can be connected to a photo-curing apparatus, a heater or a cryogenic freezer, so as to enable the microdroplets obtained to undergo further processing.

* * * * *